United States Patent [19]

Sato

[11] Patent Number: 4,465,653
[45] Date of Patent: Aug. 14, 1984

[54] NUCLEAR REACTOR

[75] Inventor: Morihiko Sato, Yokohama, Japan

[73] Assignee: Tokyo Shibaura Denki Kabushiki Kaisha, Kawasaki, Japan

[21] Appl. No.: 259,686

[22] Filed: May 1, 1981

[30] Foreign Application Priority Data

May 6, 1980 [JP] Japan .................................. 55/59711

[51] Int. Cl.³ .............................................. G21C 15/00
[52] U.S. Cl. ..................................... 376/404; 376/290
[58] Field of Search .............................. 376/402–405, 376/290, 179

[56] References Cited

U.S. PATENT DOCUMENTS

| 3,080,308 | 3/1963 | Dickinson | 376/402 |
|---|---|---|---|
| 3,153,444 | 10/1964 | Purdy et al. | 376/402 |
| 3,397,114 | 8/1968 | Deighton | 376/405 |
| 3,580,803 | 5/1971 | Everson et al. | 376/404 |
| 3,715,270 | 2/1963 | Jackson | 376/404 |
| 3,784,443 | 1/1974 | Vercasson | 376/405 |
| 3,793,143 | 2/1974 | Muller | 376/403 |
| 4,087,325 | 5/1978 | Chevallier et al. | 376/405 |
| 4,198,271 | 4/1980 | Seed et al. | 376/404 |
| 4,225,389 | 9/1980 | Howard et al. | 376/290 |
| 4,246,069 | 1/1981 | Dupuy et al. | 376/403 |
| 4,302,296 | 11/1981 | Sharbaugh et al. | 376/404 |
| 4,342,721 | 8/1982 | Pomie et al. | 376/405 |

FOREIGN PATENT DOCUMENTS 2346868  3/1975  Fed. Rep. of Germany ...... 376/290

Primary Examiner—Harvey E. Behrend
Attorney, Agent, or Firm—Oblon, Fisher, Spivak, McClelland & Maier

[57] ABSTRACT

A nuclear reactor of the type which uses liquid metal as primary and secondary coolants, and wherein the reactor vessel contains a core and a plurality of vertically extending cylindrical intermediate heat exchangers for carrying out heat exchange between the primary and secondary coolants; primary coolant circulation pumps disposed outside of the reactor vessel; a pipe for conducting to the circulation pump the primary coolant which has passed through the intermediate heat exchangers after leaving the core; and a pipe for guiding the primary coolant discharged from the circulation pump to the core through the reactor vessel.

1 Claim, 3 Drawing Figures

NUCLEAR REACTOR

BACKGROUND OF THE INVENTION

1. Field of the Invention

This invention relates to a nuclear reactor wherein liquid metal is used as primary and secondary coolants, and more particularly to a nuclear reactor which comprises a nuclear reactor vessel and a core built in the reactor vessel to be cooled by the primary coolant.

2. Background of the Prior Art

A coolant for the above-mentioned type of nuclear reactor is generally formed of, for example, liquid sodium or a mixture of liquid sodium and potassium. With such type of nuclear reactor, a primary coolant passing through a core assumes strong radioactivity. Since such radioactive coolant, if directly supplied to a steam generator, gives rise to serious hazard to the human body, the primary coolant is allowed to flow through a core and intermediate heat exchanger by means of a circulation pump. After heat exchange is carried out between the primary and secondary coolants in said intermediate heat exchanger, the secondary coolant is conducted to a steam generator to produce high pressure steam.

The conventional nuclear reactor of the above-mentioned type can be broadly classified into two types: the loop type and pool type. With the loop type, a core is set in a nuclear reactor vessel, and a primary coolant circulation pump and intermediate heat exchanger are disposed outside of the reactor vessel. All the above-mentioned members are connected together by proper piping to constitute a closed loop allowing for the passage of the primary coolant. With the closed loop, a hot primary coolant delivered from a core is carried to a circulation pump, which discharges the primary coolant in a pressurized state. Heat exchange takes place between the discharged primary coolant and secondary coolant in the intermediate heat exchanger. The primary coolant which has been drawn off from the intermediate heat exchanger and whose temperature has now decreased is sent back to the core of the reactor vessel. However, the loop type nuclear reactor has the drawbacks that a primary coolant pipe constructed outside of the reactor vessel has a complicated arrangement; not only said piping but also the reactor itself is rendered bulky, resulting in the enlargement of a nuclear reactor building; and the piping of the hot primary coolant is subject to so great a thermal stress that a complicated design must be developed to cope with said prominent thermal stress.

With the pool type, the main vessel of the above-mentioned loop type reactor comprises a core, primary coolant circulation pump, and intermediate heat exchanger. Partition walls are provided between these members, causing the primary coolant to run through the spaces defined between the partition walls and said members. The highly pressurized primary coolant discharged from the circulation pump is supplied to the core. The primary coolant rendered extremely hot while passing through the core is conducted to the intermediate heat exchange. After heat-exchanged with the secondary coolant, the primary coolant runs through the vessel back to the circulation pump.

With the pool type reactor, the primary coolant is circulated within the main vessel, making it unnecessary to provide a primary coolant pipe outside of the vessel, and indeed reducing the size of the nuclear reactor as a whole. However, the above-mentioned pool type reactor has the drawbacks that the main vessel containing the primary coolant circulation pump and the intermediate heat exchanger becomes too large to be carried as an undivided unit, and has to be manufactured in parts and put together at a site of installation, presenting difficulties in the manufacture, transport and assembly of the vessel and consequently increasing the cost of a nuclear reactor as a whole; the main vessel containing the primary coolant circulation pump and intermediate heat exchanger has its inner space substantially filled, leaving too little room for the maintenance and repair of the equipment received in the vessel; the primary coolant circulation pump has to be set between the main vessel which indicates different diametric expansions and its roof; and consequently the primary coolant circulation pump presents considerable difficulties and complications in construction and installation in order to absorb the effect of the difference in the above-mentioned diametric thermal expansion which might otherwise act on said circulation pump.

SUMMARY OF THE INVENTION

It is accordingly the object of this invention to provide a nuclear reactor of simple construction which is easily manufactured in compact form, facilitates maintenance and repair, and allows for the application of liquid metal as a coolant.

To attain the above-mentioned object, this invention provides a nuclear reactor which further comprises:

a plurality of vertically extending cylindrical intermediate heat exchangers set in the vessel of the nuclear reactor to carry out heat exchange between the primary and secondary coolants;

a primary coolant circulation pump disposed outside of the reactor vessel;

a pipe for conducting to the circulation pump the primary coolant which has passed through the intermediate heat exchanger after leaving the core; and a pipe for guiding the primary coolant discharged from the circulation pump to the core.

A nuclear reactor embodying this invention, which is constructed as described above, and wherein a core and intermediate heat exchangers are held in the vessel of the nuclear reactor has the advantages that the primary coolant circulation pumps are disposed outside of the reactor vessel, rendering the reactor vessel relatively small and allowing for easy manufacture thereof; though, as previously described, the primary coolant circulation pumps are built outside of the reactor vessel, yet pipes connecting the intermediate heat exchangers to the primary coolant circulation pumps can be made relatively short; since the primary coolant which has passed through the intermediate heat exchangers and whose temperature has been decreased runs through said connection pipes, it is possible to alleviate the thermal conditions which have to be taken into account in designing said connection pipes; the arrangement of the whole piping system is simplified, rendering the entire reactor compact; and the intermediate heat exchangers are set in the reactor vessel, and the primary coolant circulation pumps are provided outside of the reactor vessel, allowing for the simultaneous maintenance and repair of said heat exchangers and circulation pumps; and furthermore a spacious work site can be provided for the maintenance and repair.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
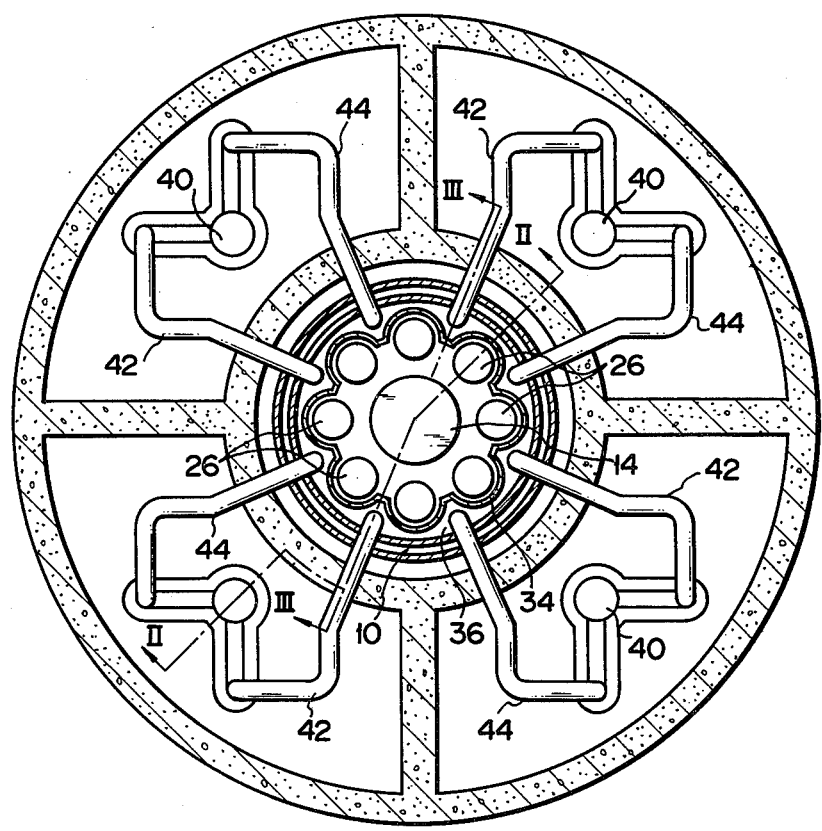
FIG. 1 is a cross sectional view of a nuclear reactor embodying this invention with the ceiling removed.
Figure 2:
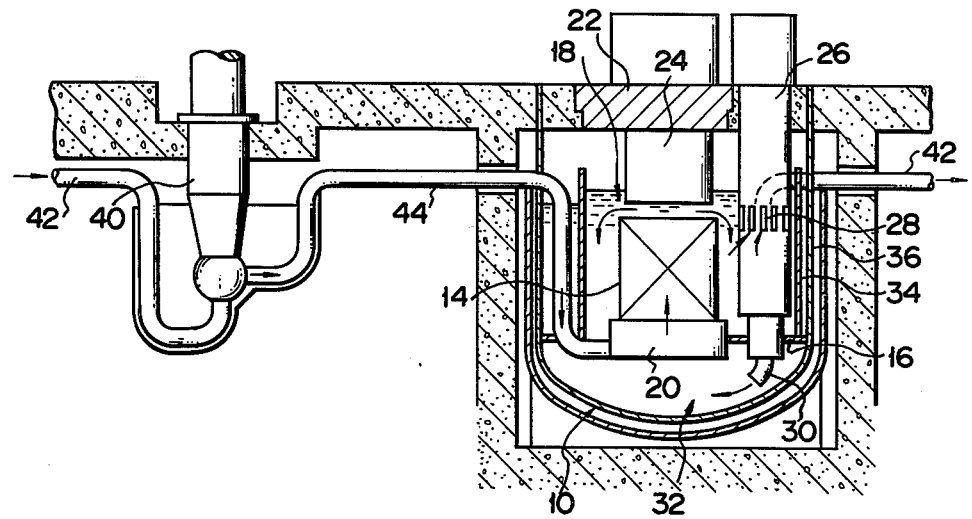
FIG. 2 is a longitudinal sectional view taken along line II—II of FIG. 1.
Figure 3:
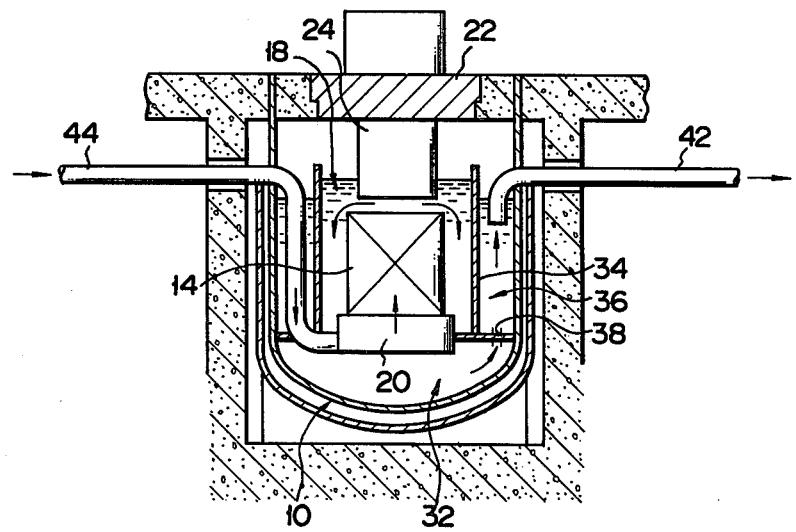
FIG. 3 is a longitudinal sectional view taken along line III—III of FIG. 1.

Description is now given with reference to FIGS. 1, 2 and 3 of a fast breeder embodying this invention in which liquid sodium is applied as a coolant. Reference numeral 10 denotes a reactor vessel containing a core 14 mounted on a support board 16. An upper plenum chamber 18 is provided above the core 14. A lower plenum chamber 20 is formed below the core 14. The upper opening of the reactor vessel 10 is covered with a shielding plug 22. An upper core structure 24 is formed below the shielding plug 22 in a state facing the upper surface of the core 14. The primary coolant flows into the reactor core 14 from the lower plenum chamber 20, is heated to a high temperature while passing through the core 14, and enters the upper plenum chamber 18.

In the reactor vessel 10, a plurality of vertically extending cylindrical intermediate heat exchangers 26 are arranged substantially around the periphery of the circular core 14, with the lower end of the respective heat exchangers 26 penetrating the core support board 16. A primary coolant inlet 28 is formed at that part of the vertically extending cylindrical heat exchanger 26 which is positioned below the level of the primary coolant held in the upper plenum chamber 18. A primary coolant outlet 30 is provided at the lower end of the heat exchanger 26. Hot primary coolant drawn out of the core 14 into the upper plenum chamber 18 flows into the intermediate heat exchanger 26 at the inlet 28. In the heat exchanger 26, heat exchange takes place between the primary and secondary coolants. The primary coolant whose temperature has now fallen runs through the outlet 30 into a lower plenum chamber 32 provided in the lower part of the reactor vessel 10 which is positioned below the core support board 16. Provided above the core support board 16 is a partition wall 34 which is shaped as a whole in the annular form and whose segments substantially surround the outer half periphery of each cylindrical heat exchanger 26.

A vertically extending plenum chamber 36 which is shaped substantially in annular form is provided between the partition wall 34 and the inner wall of the reactor vessel 10. The primary coolant drawn out of the intermediate heat exchanger 26 into the plenum chamber 32 below the reactor vessel passes through a port 38 (FIG. 3) formed in the reactor support board 16 into the annular plenum chamber 36. A plurality of primary coolant circulation pumps 40 are provided outside of the reactor vessel 10. The annular plenum chamber 36 is made to communicate with the suction side of the primary coolant circulation pump 40 by means of a primary coolant outlet pipe 42. The discharge side of the primary coolant circulation pump 40 and lower plenum chamber 32 communicate with each other by means of a primary coolant inlet pipe 44. The primary coolant whose temperature has fallen and which has entered the annular plenum chamber 32 is conducted to the circulation pump 40 through the outlet pipe 42 and discharged from the circulation pump 40 in a highly pressurized state. The highly pressurized primary coolant is sent to the lower plenum chamber 20 through the inlet pipe 44, and then to the core 14.

With a nuclear reactor embodying this invention which is constructed as described above, the primary coolant discharged from the circulation pump 40 passes through the inlet pipe 44, and lower plenum chamber 20 into the core 14. The primary coolant which has passed through the core 14 with an increase in temperature runs into the upper plenum chamber 18, and falls in temperature due to heat exchange with the secondary coolant during passage through the intermediate heat exchanger 26. The primary coolant whose temperature has now dropped flows into the lower plenum chamber 32, and then through the annular plenum chamber 36 and outlet pipe 42 back to the circulation pump 40. The primary coolant which has traveled through the aforementioned route has covered the whole of its circulation course, and is brought to a state ready for succeeding circulation.

According to the above-mentioned circulation course of the primary coolant, only the intermediate heat exchangers 26 are set in the reactor vessel 10, and the primary coolant circulation pumps 40 are disposed outside of the reactor vessel 10. Therefore, the reactor vessel 10 can be rendered appreciably compact as in the conventional loop type reactor, and can be manufactured easily. Since only the primary coolant circulation pumps 40 are installed outside of the reactor vessel 10, it is possible to reduce the length of the outlet pipe 42 and inlet pipe 44 of the primary coolant, both being located outside of the reactor tank 10. Further, these outlet and inlet pipes 42, 44 allow for the passage of only the primary coolant which has passed through the intermediate heat exchangers 26 and whose temperature has dropped, making it possible to alleviate the thermal conditions to be taken into account in designing a nuclear reactor, and consequently facilitating the design and manufacture of pipes and simplifying their entire arrangement. Further, the primary coolant circulation pumps 40 built outside of the reactor vessel 10 can be simplified in construction and installation, assuring easy maintenance and repair of said circulation pumps 40 and intermediate heat exchangers 26.

The foregoing description refers to only one embodiment of this invention. It will be noted that the invention is not limited to said embodiment. For instance, the aforementioned partition wall and plenum chambers need not always be provided.

What is claimed as new and desired to be secured by Letters Patent of the United States is:

1. A nuclear reactor of the type utilizing liquid as primary and secondary coolants, comprising:
   a reactor vessel for containing said primary coolant;
   a core positioned in the reactor vessel for cooling via said primary coolant;
   a plurality of primary liquid metal coolant circulation pumps positioned outside of said reactor vessel separately therefrom and not submerged in said primary coolant;

a plurality of intermediate liquid metal heat exchangers directly detachably mounted to an upper portion of the reactor vessel and extending into the interior of the reactor vessel for permitting heat exchange between the liquid metal primary coolant and the liquid metal secondary coolant, said intermediate heat exchangers being arranged in a circular configuration within said reactor vessel with the core serving as a center of said configuration and wherein said intermediate heat exchangers are at substantially the same elevational level as the core;

a substantially annular partition wall disposed between the intermediate heat exchangers and an inner wall portion of the reactor vessel defining an annular region containing liquid metal primary coolant and means for allowing the liquid metal primary coolant which is passed through each said intermediate heat exchanger after leaving the core to enter said annular region;

first pipe means for conducting the liquid metal primary coolant from said annular region to the outside of said reactor vessel and into each said primary coolant circulation pump; and second pipe means for conducting the liquid metal primary coolant discharged from each said primary coolant circulation pump into said reactor vessel and to the bottom of the core in said reactor vessel.

* * * * *